Figure 1:
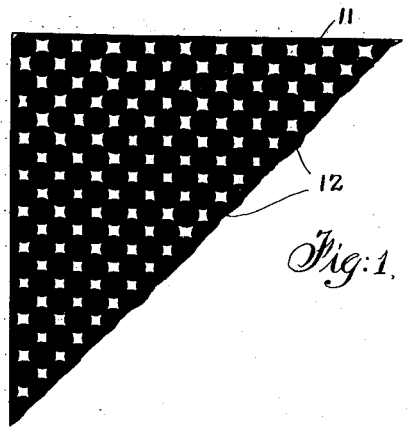

W. R. B. LARSEN.
METHOD OF PRODUCING DOT SCREENS FOR PHOTOGRAPHIC WORK.
APPLICATION FILED JUNE 6, 1913.

1,167,506.

Patented Jan. 11, 1916.

Inventor,
Werner Robert Bueck Larsen.
By his Attorney
W. P. Hutchinson.

UNITED STATES PATENT OFFICE.

WERNER ROBERT BUSCH LARSEN, OF COPENHAGEN, DENMARK.

METHOD OF PRODUCING DOT-SCREENS FOR PHOTOGRAPHIC WORK.

1,167,506.  Specification of Letters Patent.  Patented Jan. 11, 1916.

Application filed June 6, 1913. Serial No. 772,171.

*To all whom it may concern:*

Be it known that I, WERNER ROBERT BUSCH LARSEN, of Copenhagen, Denmark, have invented a new and useful Improvement in Methods of Producing Dot-Screens for Photographic Work, of which the following is a full, clear, and exact description.

My invention relates to improvements in the art of half-tone negative production, and more especially to improvements in the method of producing a dot screen for such work.

My invention is adapted to be used in the production of half-tone negatives where two screens are used, one a line screen and the other a dot screen, the negative being exposed through both screens at once during the entire time of exposure, or if desired, using both screens during the first part of the exposure and allowing the latter part of the exposure to be effected through the dot screen alone.

The particular object of this invention is to produce in a simple manner a dot screen which is adapted to the above use.

Reference is to be had to the accompanying drawings forming a part of this specification, in which similar reference characters indicate corresponding parts in all the views.

Figure 2:
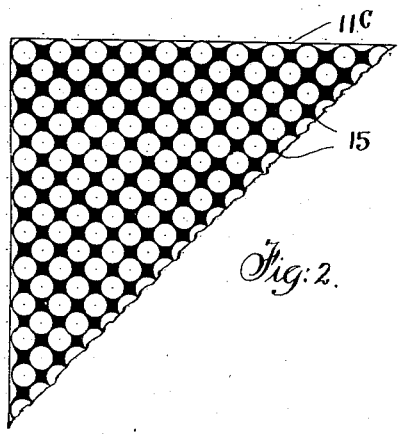
Figure 3:
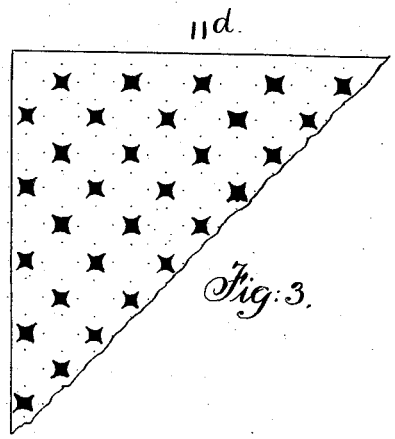
Figure 4:
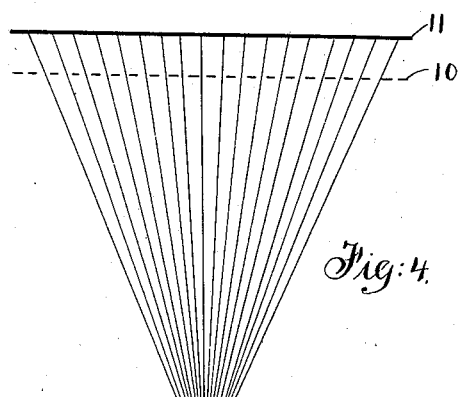

Figure 1 is a detail greatly enlarged, of a negative used for making a dot screen. Fig. 2 is a greatly enlarged detail of a positive plate taken after the negative and showing the dot screen in its first stage. Fig. 3 is a view of the dot screen after a portion of the opaque spots have been removed, and Fig. 4 is a diagrammatic view showing how the dot screen is produced.

In making the dot screen which I use in the production of half-tone negatives, I arrange an ordinary line screen 10 in the camera in front of and a short distance from a sensitive plate 11. The camera is then adjusted for the most reduced scale of reproduction for which the screens will be used. In front of the camera lens 13 a white illuminated screen is placed. When the sensitive plate 11 is exposed through this line screen 10, the plate 11 is affected by the light which passes through the translucent part of the screen 10, and the plate 11 is exposed for a longer time so that the illuminated parts or dots 12 reach each other as shown in Fig. 1. If now a positive is printed from this plate 11, a dot screen 11$^c$ is shown as in Fig. 2, the opaque elements 15 here corresponding to the intersections of the lines on the line screen 10, and from this positive 11$^c$ the alternate rows of dots 15 in each direction can be removed as shown in Fig. 3, and the plate 11$^d$ then used as a dot screen. The removal of these alternate rows of dots in either direction can be effected in any mechanical way desired, preferably by scraping away some of the surface in strips by means of a burin guided by a ruling machine.

It will be understood that as the line screen 10 was placed a short distance from the sensitive plate 11, the pitch of the dots 12 when developed will differ a little from the pitch of the lines on the line screen 10. It will also be understood that after exposure the plates are developed in the usual way or in any preferred manner.

I claim:—

1. The improvement in the art of producing dot screens used in taking half-tone negatives, which consists in exposing a sensitive plate through a line screen, developing the plate so exposed, producing a positive plate from the thereby obtained negative, and removing alternate rows of opaque spots from the said positive plates.

2. The herein described improvement in the art of producing dot screens for use in taking half-tone negatives, which consists in exposing a sensitive plate through a line screen, developing the plate so exposed, producing a positive plate from the negative when developed, and removing opaque spots at intervals from said positive plate.

In testimony whereof I affix my signature in presence of two witnesses.

WERNER ROBERT BUSCH LARSEN.

Witnesses:
 C. V. SCHOU,
 VIGGO BLOM.